Nov. 29, 1938.  V. NEMEROFF  2,138,744
BED LAMP
Filed Feb. 18, 1938
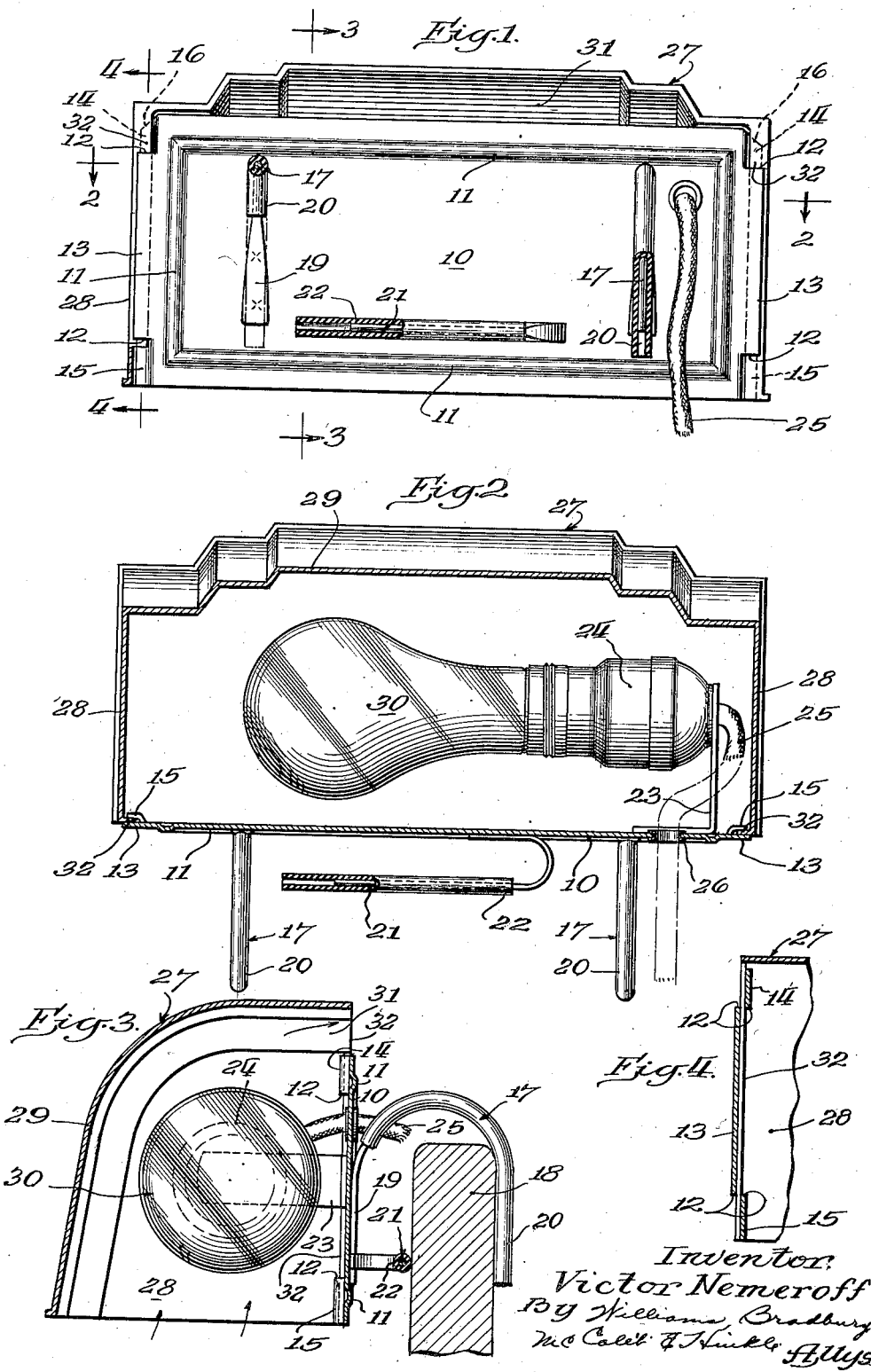

Patented Nov. 29, 1938

2,138,744

UNITED STATES PATENT OFFICE 2,138,744

BED LAMP

Victor Nemeroff, Chicago, Ill., assignor to Electro Manufacturing Co., Chicago, Ill., a corporation of Illinois Application February 18, 1938, Serial No. 191,215

3 Claims. (Cl. 240—4)

This invention relates to lamps and particularly to bed lamps or other lamps which are adapted to be suspended from bedsteads or from other articles of furniture.

One of the principal objects of the invention is to provide a lamp of this type which is simple to manufacture and to assemble and which is readily adapted for production in various styles and colors.

According to the invention I form my improved lamp of two portions, a back plate, which may suitably be in the form of a light reflecting metal sheet, and a canopy which is removably mounted thereon. The back plate carries the socket for a conventional incandescent bulb and also carries the supporting means whereby the lamp may be located in desired position.

The invention will readily be understood from the following description of a preferred embodiment thereof, taken in conjunction with the accompanying drawing, in which:

Fig. 1 is a rear elevational view of the lamp, with portions of the supporting elements broken away;

Fig. 2 is a sectional plan view therethrough, the section being taken on the line 2—2 of Fig. 1;

Fig. 3 is a sectional view, taken on the line 3—3 of Fig. 1, showing the lamp mounted on a suitable support, and Fig. 4 is a fragmentary sectional view, taken on the line 4—4 of Fig. 1.

Referring to the drawing, the reference numeral 10 designates the back plate which may suitably be an oblong piece of reflective metal or a piece of metal which is preferably coated with aluminum paint, or the like. The metal plate 10 is provided with suitable corrugated formations 11 for the purpose of rendering it more rigid. The marginal ends of the plate 10 are slit at 12 to provide end flanges 13, 14 and 15. The central flange 13 is considerably larger than either the upper flange 14 or the lower flange 15, and lies in the general plane of the plate 10. The flanges 14 and 15 are displaced forwardly with respect to the flanges 13 and they are located in spaced relation to the flanges 13, as best seen in Fig. 4. The upper corners of the plate 10, including the flanges 14, are chamfered as shown at 16.

On the rear side of the plate 10 I mount hooks 17 whereby the lamp may be mounted on an end board 18 of a bedstead, or on any other suitable supporting member. The hooks 17 may suitably be formed of a stout piece of wire, bent into suitable shape. Each hook may have one end flattened, as shown at 19, which flattened ends may be secured to the plate 10 by spot welds or other suitable means.

The free ends of the hooks 17 may be covered by a section of rubber tube 20 in order to protect the furniture from being marred. I provide a bumper member or abutment 21 which is adapted to abut against the forward side of the supporting member 18 and maintain the plate 10 in spaced relation thereto. This bumper may also be in the form of a hook, the hook portion being relatively small so that the major length, which extends horizontally, is located a suitable distance in front of the downwardly extending ends of the hooks 17. The bumper 21 may also be encased by a piece of rubber tube 22.

On its forward side the plate 10 has rigidly mounted on its front side an L-shaped bracket 23 which carries a conventional lamp socket 24. The lamp cord 25 extends through an opening 26 formed in the plate 10.

The canopy 27 consists of a rigid integral structure. It may suitably be formed of molded plastic material, so that it may consist of a single integral piece comprising end walls 28 and a generally arcuate front wall 29 which connects the two end walls, and extends forwardly from the upper portion of the back plate 10 and downwardly to provide a front wall which serves as a shade for the incandescent light bulb 30 carried by the scoket 24. The employment of a canopy 29 of molded plastic material enables a wide degree of colors to be obtained and enables employment of colored translucent canopies or shades which permit general illumination of a soft colored character while providing strong illumination below the lamp to adapt it for use by a reclining reader. The canopy 27 and back plate 10 are correlated to provide a ventilating opening 31 to permit escape of heated air from the under side of the canopy. In the embodiment of the invention illustrated, this opening is provided by the central enlargement of the canopy.

Along the rear edges of the end walls 28 are located small inwardly extending flanges 32 which are adapted to cooperate with the flanges 13, 14 and 15 in order to assemble the lamp shade. In manufacturing and assembling the lamp shade, the plate 10 is completely fabricated and it is then slipped onto the canopy, the flanges 14 and 15 being located on the forward sides of the flanges 32 and the flanges 13 being located on the rear sides of the flanges 32. The upper flanges 14 being located on the inner sides of the flanges 32, their chamfered upper edges engage the canopy at the upper rear corners and locate the back 10 in proper registry with the canopy 27.

Although the invention has been disclosed in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A lamp of the class described comprising a vertically disposed horizontally elongated metal plate, a lamp socket mounted on the front face of such plate and arranged to support a lamp bulb alongside said plate, attaching means mounted on the rear face of such plate and arranged to engage an upper edge of a piece of furniture whereon the lamp is to be mounted, a pair of spaced apart horizontal slits formed in each end edge of such plate and dividing such end edge into three relatively wide, spring tongues, the intermediate tongue of each such end edge occupying a vertical plane spaced from a vertical plane occupied by the other two tongues, a relatively rigid frameless canopy, open at back and bottom, which comprises a generally arcuate front wall and a pair of end walls having vertically disposed rear edges, and inwardly turned vertical flanges formed on the rear edges of the end walls of the canopy, said flange being of a width to fit frictionally between and to be longitudinally embraced by said spring tongues, whereby each of such canopy end wall flanges will have one of its faces engaged by the intermediate tongue at one end of the metal plate and having the other of its faces engaged by the other two tongues at the same end of such metal plate.

2. A lamp of the class described comprising a vertically disposed horizontally elongated metal plate, a lamp socket mounted on the front face of such plate, a pair of spaced apart downwardly opening hooks mounted on the rear face of such plate and arranged to engage an upper edge of a piece of furniture whereon the lamp is to be mounted, a plurality of offset, outwardly extending, spring tongues at each end of such plate, a relatively rigid frameless canopy open at back and bottom, said canopy comprising a generally arcuate front wall and a pair of end walls having vertically disposed rear edges and inwardly turned vertical flanges formed on the rear edges of the end walls of the canopy, each of such canopy end wall flanges being of a width to be frictionally engaged and embraced on its opposite faces by the tongues of the metal plate.

3. A lamp of the class described comprising a vertically disposed horizontally elongated metal plate, incandescent lamp bulb supporting means carried on the front face of such metal plate, means mounted on the rear face of such plate and arranged to engage an upper edge of a piece of furniture whereon the lamp is to be mounted and to space such plate from the piece of furniture to provide a substantial air space between said plate and such piece of furniture, three offset, spring tongues outwardly extending from opposite side edges of said metal plate, a substantially rigid frameless canopy open at back and bottom, said canopy having a generally arcuate front wall and a pair of end walls and an inwardly turned vertical flange formed on the rear edge of each end wall of the canopy, said plate being of a length to extend entirely across the open back of said canopy, and each of such canopy end wall flanges having one of its faces of a width to be engaged by the intermediate tongue at one end of the metal plate and having the other of its faces of a width to be engaged by the other two tongues at the same end of such metal plate, whereby to provide a vertically extending connection between said plate and flanges and said plate being spaced from said arcuate wall of said canopy to provide an opening into the space within said canopy for the escape of heated air therefrom.

VICTOR NEMEROFF.